Figure 1:
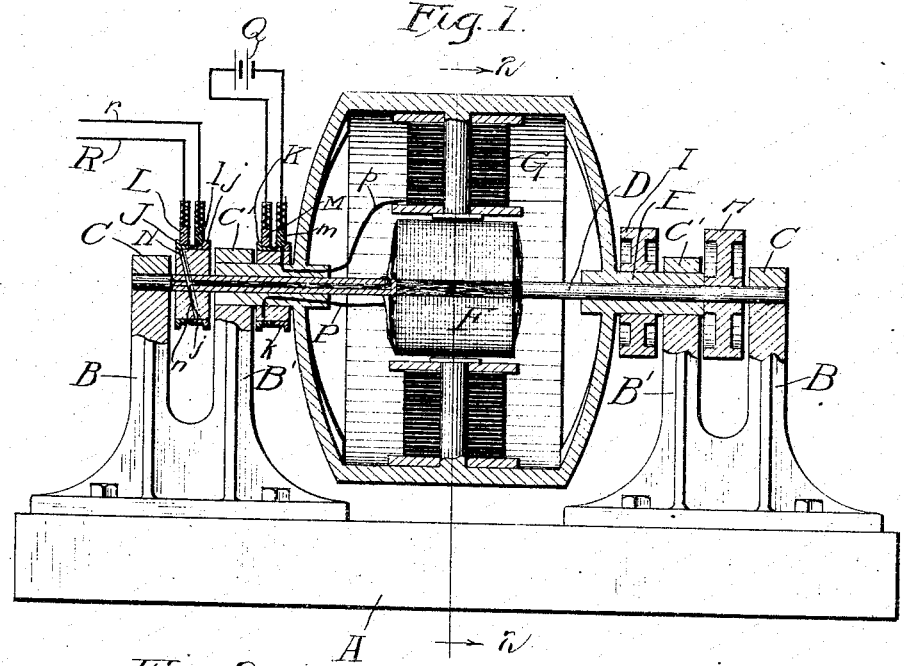

V. C. GOODRIDGE.
DYNAMO.
APPLICATION FILED SEPT. 2, 1913.

1,212,476. Patented Jan. 16, 1917.

Witnesses:
Arthur Haegg
J. Sampson Goodridge

Inventor
Victor C. Goodridge
by Charles Turner Brown,
Attorney.

UNITED STATES PATENT OFFICE.

VICTOR C. GOODRIDGE, OF CHICAGO, ILLINOIS.

DYNAMO.

1,212,476.  Specification of Letters Patent.  Patented Jan. 16, 1917.

Application filed September 2, 1913.  Serial No. 787,692.

*To all whom it may concern:*

Be it known that I, VICTOR C. GOODRIDGE, a citizen of the United States, and a resident of Chicago, in the county of Cook and State of Illinois, have invented certain new and useful Improvements in Dynamos, of which the following, when taken in connection with the drawing accompanying and forming a part hereof, is a specification.

This invention relates to dynamos which are used to generate what is known in the art as an alternating current.

The object of the invention is to obtain an alternating current dynamo which will generate a current of high frequency, without requiring dangerously high speed in the rotation of the movable parts of the device.

Additional objects are to obtain a dynamo which will be durable, not liable to break or get out of order, which will not be complicated in construction, and which will be easily understood and operated by those skilled in the art.

Figure 2:
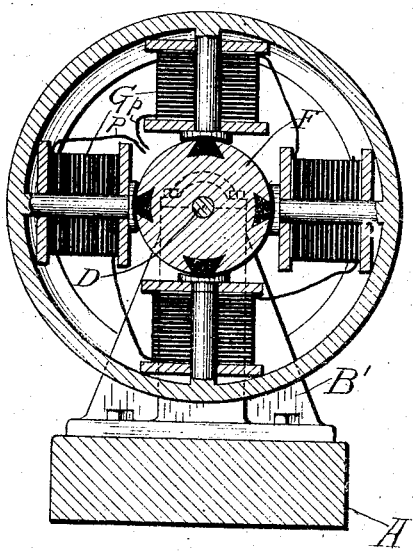
Figure 3:
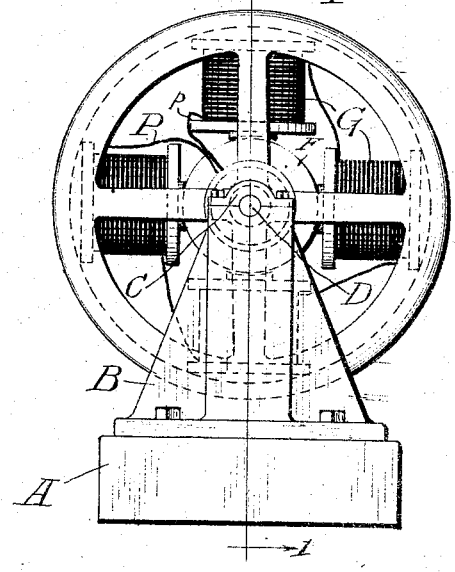

In the drawing referred to Figure 1 is a vertical section, on line 1—1 of Fig. 3, viewed in the direction indicated by the arrows. Fig. 2 is a vertical section, on line 2—2 of Fig. 1, viewed in the direction indicated by the arrows. And Fig. 3 is an end elevation of the device.

A reference letter applied to designate a given part is used to indicate said part wherever the same appears.

A is the base or foundation of the device.

B, B¹ are standards which are rigidly secured to the base A.

C, C¹, are journal boxes on standards B, B¹.

D is a shaft which is rotatably mounted in journal boxes C, C.

E is a hollow shaft which is rotatably mounted in journal boxes C¹, C¹. Shafts D and E are concentric, with shaft D extending entirely through the shaft E, but said shafts not fitting so closely together but what they may freely revolve in opposite directions.

F is the armature of the device, and is rigidly secured to shaft D to revolve therewith.

G is the field magnet of the device, and is rigidly secured to shaft E, to revolve therewith.

H is a wheel or pulley which is secured to shaft D to turn therewith, and said shaft is rotated by the turning of said wheel.

I is a wheel or pulley on shaft E, to turn therewith, so that the rotation of said wheel I rotates the shaft E.

J, j are the armature collector rings, and K, k, the field collector rings.

L is a brush to collector ring J, and l to collector-ring j.

M is the brush to collector ring K and m to collector ring k.

N, n are wires of the armature which extend through passage way O in shaft D and are respectively attached to the collector rings J, j.

P, p, are the wires to collector rings K, k, respectively.

Q is an exciting battery, (primary or storage), or dynamo, which is installed in the field magnet circuit, in the ordinary way of installing the field exciting means. The current generated by this dynamo is conveyed on the wires R, r, which are respectively attached to the brushes M, m, to the place where said current is utilized.

To operate the device the shaft D is rotated in one direction and the shaft E is rotated in the opposite direction. The frequency of the current generated is produced in the same way as in an ordinary dynamo; but with the field magnet turning at a given speed and the armature at the same speed the frequency of the current is doubled in this device over what it is with the armature at rest, as in other alternating dynamos.

The particular manner of winding the field magnet coils and of winding the armature form no part of this invention.

I claim:—

In a dynamo, the construction and arrangement of parts, comprising an integral U-shaped standard, a shaft journaled in the outer arm thereof, a hollow shaft concentric with the first-named shaft journaled in the inner arm thereof, one member of the dynamo electric machine secured to the outer shaft and another member of the dynamo electric machine secured to the inner shaft, and collecting devices for said members mounted on said shafts, at least one of which is located between the arms of said U-shaped standard.

VICTOR C. GOODRIDGE.

In the presence of—
J. SAMPSON GOODRIDGE,
D. E. GOODRIDGE.